Aug. 28, 1923.
W. F. RESCHKE
MECHANISM FOR FUEL OIL GENERATION
Filed Dec. 31, 1921
1,466,250
2 Sheets-Sheet 2
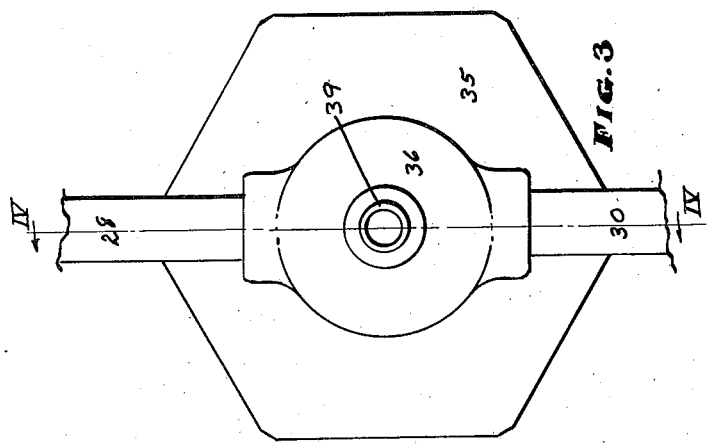
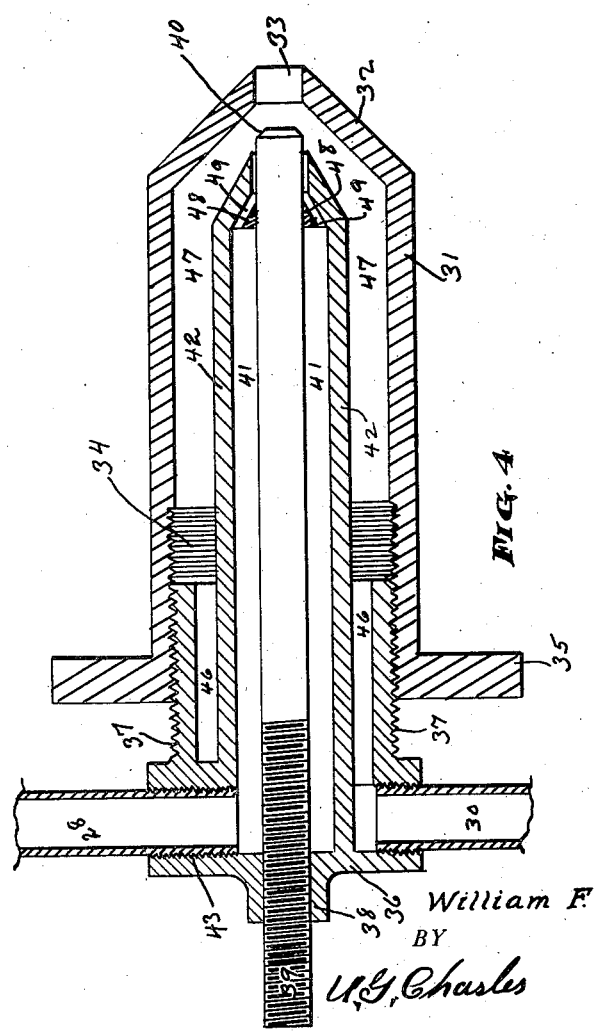
INVENTOR.
William F. Reschke
BY
U.G. Charles
ATTORNEY.

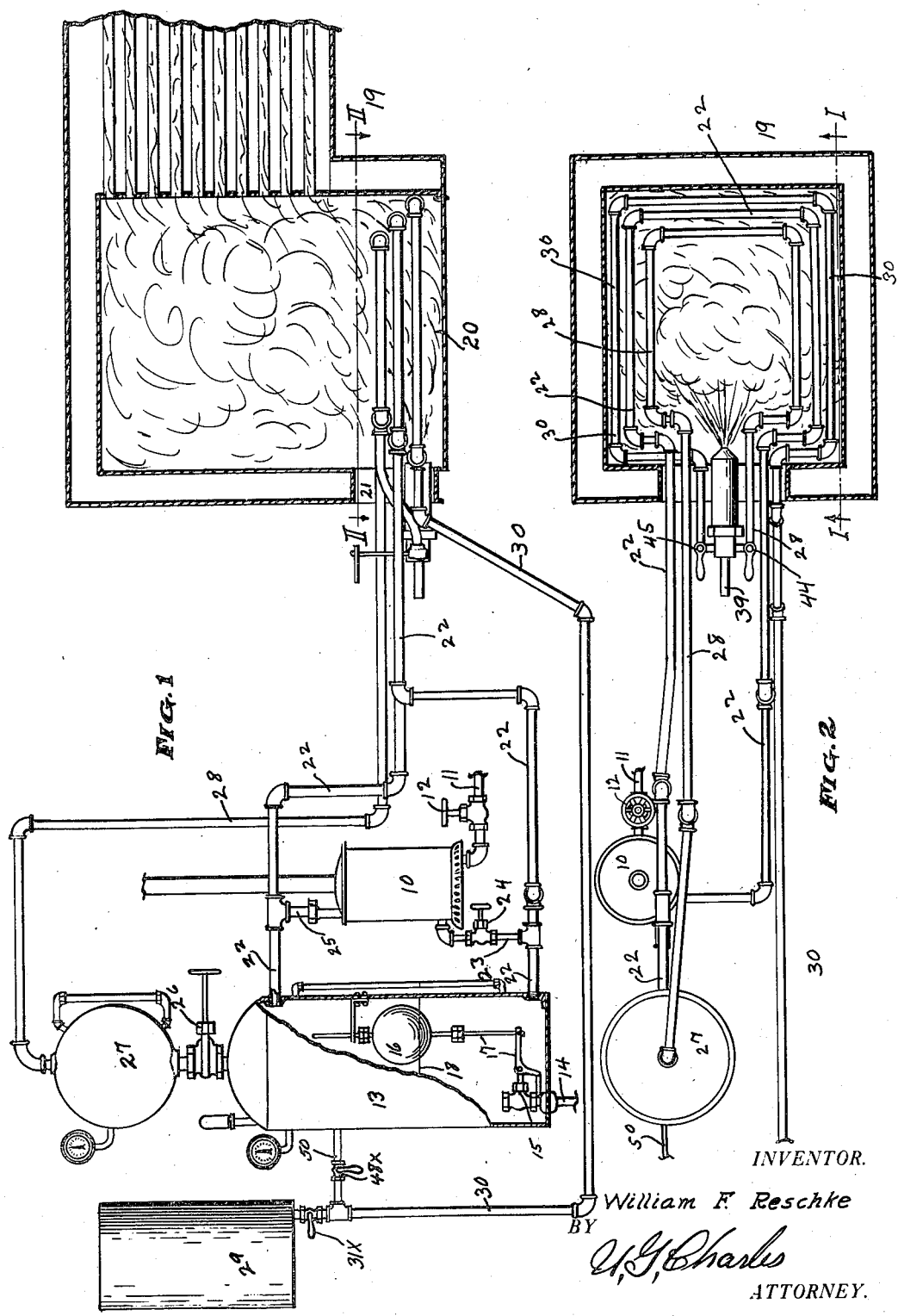

Patented Aug. 28, 1923.

1,466,250

UNITED STATES PATENT OFFICE.

WILLIAM F. RESCHKE, OF WICHITA, KANSAS.

MECHANISM FOR FUEL-OIL GENERATION.

Application filed December 31, 1921. Serial No. 526,160.

*To all whom it may concern:*

Be it known that I, WILLIAM F. RESCHKE, a citizen of the United States, residing at Wichita, in the county of Sedgwick and State of Kansas, have invented certain new and useful Improvements in Mechanism for Fuel-Oil Generation, of which the following is a description referring to the accompanying drawings, and which form a part of this specification.

The invention relates to an improvement in the equipment as embodied in a mechanism, for combining air with preheated fuel oil under superheated steam pressure and thereby generating an oil vapor requisite for heating purposes in boilers, steam plants and the like as employed in heating residences, apartments and the like and for such other uses as the class of invention comprehends. In the following description a preferred type of burner is illustrated to show the adaptation of the other elements of the invention for performing the requisite functions, though other types of burners may be used in lieu of the form illustrated. In the drawings, Fig. 1 shows a side elevation of the mechanism and parts and in combination with a firepot of a steam plant of any desired type as sectioned along the line I—I, Fig. 2. Fig. 2 is a plan view of Fig. 1 showing the sectional view of the firepot taken along the line II—II Fig. 1. Fig. 3 is a rear end view of the preferred burner. Fig. 4 is a sectional view taken along the line IV—IV, Fig. 3. Similar numerals of reference indicate corresponding parts throughout all the figures of the drawings.

Referring to the drawings, 10 shows a heater similar in type to that ordinarily employed in heating water. Oil or gas as fuel therefor enters to the burner thereof (not shown) through the pipe 11 controlled by the valve 12. At 13 is a covered tank; water under pressure flows into the tank 13 through the pipe 14 and valve mechanism 15, the ball 16 connecting through the lever system 17 operates the valve 15 to maintain the desired water level 18 in the tank 13. The heating plant 19 has a firepot 20 through which is seen a door opening 21 for admitting certain piping as illustrated. The water pipe 22 leads from the base of the tank 13 passing through the opening 21 and around the firepot 20 and empties into the upper portion of the tank 13. A pipe 23 leads from the pipe 22, the valve 24 when opened admitting water to the coils of the heater 10 where it becomes heated passing through the pipe 25 into the upper pipe 22 as steam and led into the tank 13. The valve 26 when opened admits the steam from the tank 13 into the reservoir 27 from which it travels once around and through the firepot 20, flowing in the pipe 28 which conducts the steam to the burner as later explained. The fuel oil is contained in the tank 29, a pipe 30 leads therefrom, the oil flow into which being controlled by the valve $31^x$. The pipe 30 likewise travels once around and within the firepot 20.

Referring to Figs. 3 and 4, a cylindrical sleeve or barrel 31 tapered at its end 32 has an opening as a port 33 in the base thereof. The barrel 31 is internally threaded at 34 and provided with a hexagonal cap 35. A member such as the casting 36 is externally threaded and its threads 37 engage the threads 34 of the barrel 31, the hexagonal nut 35 permitting an adjustable means for moving the barrel 31 to such a desired position as to best function in the generating process.

The cap of the member 36 is threaded at 38 and the air pipe 39 is adjustably threaded and engaged therewith and in the longitudinal axis of the member 36 and preferably projecting beyond the same at its outer end 40; a steam chamber 41 within the longitudinal walls 42 of the member 36 receives the steam carried by the pipe 28 threadably engaged therewith at 43. The valve 44 controls the volume of steam admitted to the chamber 41.

The fuel pipe 30 admits the fuel oil passing the control valve 45 into a port 46 surrounding the walls 42 and the oil enters the chamber 47 within the barrel 31. A bushing, tapered in section as shown at 48 is rigid on the pipe 39 near its outer end and within the chamber 41; by adjusting the pipe 39 forward or backward at 38, the ports 49 can be decreased in size or enlarged as desired to control the steam volume passing into the chamber 47.

The mechanism operates as follows:

The water valve 24 is opened and the burner in the heater 10 is ignited. Steam is generated in this heater and passes through the pipes 25, 22, 28 into and through the chamber 41 and out the port 49. The valve $31^x$ is opened and the oil received into the chamber 47 is blown by the steam and mixed with the air as discharged at 40 and the combined vapor mixture on passing the port 33 on being ignited fires the boiler 19.

The fire within the boiler now heats the water circulating within the chamber in the pipe 22 and changes it to steam which then returns to the reservoir 27 and the burner in the heater 10 may then be turned off and the valve 24 closed. The pipe 28 carrying the steam returning through the firepot superheats the steam before entering the chambers 41 and 47.

The fuel oil passing around the firepot through the pipe 30 also becomes preheated.

The threaded adjustments at 38 and 34 enable an accurate adjustment and coordination of the several parts affecting the proper relationship of volumes and flow, respectively, of air, fuel oil and steam for perfect generation.

When not in operation, the water line 14 is cut off, the valve 31ˣ is closed and the steam is admitted to the oil line 30 from the tank 13 by opening the valve 48ˣ on the connecting pipe 50, thus blowing oil sediment, etc., out of the line 30, port 46 and chamber 47 for cleansing purposes.

Such modifications may be employed as lie within the scope of the appended claims. Having fully described my invention, what I now claim as new and desire to secure by Letters Patent is:

1. In mechanism of the class described; a closed tank, a water line and valve mechanism for controlling water flow into said tank; a firepot, a water line circulating from the tank through the firepot and returning to the tank above the water line; a water heater in a pipe service short circuiting between the outflow and inflow of the last mentioned water line; a steam line leading from the tank through and around the firepot and connecting to a burner mechanism; an air intake and a fuel oil intake in said burner mechanism.

2. In mechanism of the class described; a closed tank, a water line and valve mechanism for controlling water flow into said tank; a firepot, a water line circulating from the tank through the firepot and returning to the tank above the water line; a water heater in a pipe service short circuiting between the outflow and inflow of the last mentioned water line; a steam line leading from the tank through and around the firepot and connecting to a burner mechanism; an air inlet pipe in said burner mechanism, a fuel oil supply, a pipe leading therefrom circuitously through said firepot and through said burner mechanism.

3. In mechanism of the class described; a closed tank, water line and valve mechanism for controlling water flow into said tank; a firepot, a water line circulating from the tank through the firepot and returning to the tank above the water level, a water heater in a pipe service short circuiting between the outflow and inflow of the last mentioned water line; a steam line leading from the tank through and around the firepot and connecting to a burner mechanism; an air inlet pipe in the burner mechanism; a fuel oil supply, a pipe leading therefrom circuitously through said firepot and through said burner mechanism; a pipe, a valve control thereon, connecting intermediate said tank and the fuel oil pipe, all for the purposes as specified.

WILLIAM F. RESCHKE.

Witness:
M. Y. CHARLES.